(12) United States Patent
Lopez

(10) Patent No.: US 11,030,311 B1
(45) Date of Patent: Jun. 8, 2021

(54) DETECTING AND PROTECTING AGAINST COMPUTING BREACHES BASED ON LATERAL MOVEMENT OF A COMPUTER FILE WITHIN AN ENTERPRISE

(71) Applicant: CA, Inc., San Jose, CA (US)

(72) Inventor: Alejandro Mosquera Lopez, Reading (GB)

(73) Assignee: CA, Inc., San Jose, CA (US)

( * ) Notice: Subject to any disclaimer, the term of this patent is extended or adjusted under 35 U.S.C. 154(b) by 212 days.

(21) Appl. No.: 16/125,397

(22) Filed: Sep. 7, 2018

(51) Int. Cl.
| | |
|---|---|
| *G06F 21/00* | (2013.01) |
| *G06F 21/56* | (2013.01) |
| *G06F 21/55* | (2013.01) |
| *G06K 9/62* | (2006.01) |
| *G06F 11/34* | (2006.01) |
| *G06N 20/00* | (2019.01) |

(52) U.S. Cl.
CPC ............ *G06F 21/565* (2013.01); *G06F 11/34* (2013.01); *G06F 21/552* (2013.01); *G06F 21/554* (2013.01); *G06K 9/6217* (2013.01); *G06N 20/00* (2019.01); *G06F 2201/81* (2013.01)

(58) Field of Classification Search
None
See application file for complete search history.

(56) References Cited

U.S. PATENT DOCUMENTS

| | | | | |
|---|---|---|---|---|
| 10,326,778 B2 * | 6/2019 | Gong | ................... | G06F 21/577 |
| 10,645,109 B1 * | 5/2020 | Lin | .................... | H04L 63/1425 |
| 2016/0063471 A1 * | 3/2016 | Kobres | ................... | H04L 63/08 705/18 |
| 2016/0065601 A1 * | 3/2016 | Gong | .................. | H04L 63/1416 726/23 |
| 2017/0063908 A1 * | 3/2017 | Muddu | .................... | H04L 43/00 |
| 2018/0176243 A1 * | 6/2018 | Arnaldo | ............... | G06N 3/0454 |

(Continued)

OTHER PUBLICATIONS

Klassen, Myungsook; Yang, Ning. Anomaly based intrusion detection in wireless networks using Bayesian classifier. 2012 IEEE Fifth International Conference on Advanced Computational Intelligence (ICACI). https://ieeexplore.IEEE.org/stamp/stamp.jsp?tp=&arnumber=6463163 (Year: 2012).*

(Continued)

*Primary Examiner* — Jeremiah L Avery
(74) *Attorney, Agent, or Firm* — Shook, Hardy & Bacon L.L.P.

(57) ABSTRACT

Detecting and protecting against computing breaches based on lateral movement of a computer file within an enterprise. A method may include obtaining data associated with an existence a computer file in a first computing device and a second computing device of an enterprise, detecting a pattern of lateral movement of the computer from the first computing device to the second computing device over a predetermined period of time, based on the data, calculating a likelihood score that the computer file is malicious based on the detected pattern, determining that the likelihood score satisfies a predetermined breach threshold, and in response to determining that the likelihood score satisfies the predetermined breach threshold, initiating remedial action on the computer file to protect the enterprise against the computer file.

20 Claims, 4 Drawing Sheets

(56) References Cited

U.S. PATENT DOCUMENTS

2018/0219894 A1* 8/2018 Crabtree ............. H04L 63/1425
2019/0132344 A1* 5/2019 Lem ....................... G06N 5/003

OTHER PUBLICATIONS

Wen, Ding. An Incentive Compatible Two-Hop Multi-copy Routing Protocol in DTNs. 2013 IEEE 9th International Conference on Mobile Ad-hoc and Sensor Networks. https://ieeexplore.IEEE.org/stamp/stamp.jsp?tp=&arnumber=6726322 (Year: 2013).*

Qosmos ENEA; "Deep Packet Inspection for Lateral Movement Detection; Enabling Faster, More Accurate Detection of Network Infiltration"; located at: http://www.qosmos.com/wp-content/uploads/2017/10/Qosmos_DPI-for-Lateral-Movement-Detection_Use-Case_171011.pdf; accessed on Sep. 7, 2018; 2 pages.

Soria-Machado, M. et al.; "Detecting Lateral Movements in Windows Infrastructure"; CERT-EU Security Whitepaper 17-002; located at: http://cert.europa.eu/static/WhitePapers/CERT-EU_SWP_17-002_Lateral_Movements.pdf; dated Feb. 27, 2017; accessed on Sep. 7, 2018; 22 pages.

Infosec Resources 2018; Infosec Institute "Advance Persistent Threat—Lateral Movement Detection in Windows Infrastructure—Part I"; dated Mar. 14, 2018; located at: https://resources.infosecinstitute.com/advance-persistent-threat-lateral-movement-detection-windows-infrastructure-part/#gref; accessed on Sep. 7, 2018; 8 pages.

BDS-Analytic; "Lateral Movement—Lateral Movement 2.0 Incident Descriptions and Recommended Actions"; White paper; version 2.0.0; Aug. 21, 2018; 4 pages.

* cited by examiner

DETECTING AND PROTECTING AGAINST COMPUTING BREACHES BASED ON LATERAL MOVEMENT OF A COMPUTER FILE WITHIN AN ENTERPRISE

BACKGROUND

Enterprise security attackers that breach computer networks may move progressively from one computing device in the network to another computing devices in the network searching for key assets and data in a process known as lateral movement. During this process attackers may drop malware implants and/or make use of dual-use tools in different computing devices in order to assist their activities. Lateral movement may be an intermediate step taken by an attacker before the unauthorized transfer of data from the network (i.e., exfiltration) or other compromise takes place. Thus, it is important to detect breaches during their lateral movement stage before attackers can damage or steal assets.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for detecting and protecting against computing breaches based on lateral movement of a computer file within an enterprise may include obtaining data associated with an existence a computer file in a first computing device and a second computing device of an enterprise, detecting a pattern of lateral movement of the computer from the first computing device to the second computing device over a predetermined period of time, based on the data, calculating a likelihood score that the computer file is malicious based on the detected pattern, determining that the likelihood score satisfies a predetermined breach threshold, and in response to determining that the likelihood score satisfies the predetermined breach threshold, initiating remedial action on the computer file to protect the enterprise against the computer file.

In some embodiments, the method may further include calculating a context score using the detected pattern, determining that the context score satisfies a predetermined context threshold, and in response to determining that the context score satisfies the predetermined context threshold, providing context information about the computer file to a user, where the context information is in addition to data associated with the movement of the computer file.

In some embodiments, initiating remedial action on the computer file may further include one or more of deleting the computer file, quarantining the computer file, blocking the computer file from transfer to another device, or communicating the likelihood score to a user, or some combination thereof. In some embodiments, obtaining data associated with the movement of the computer file may further include one or more of detecting a creation of the computer file, detecting update of the computer file, or detecting execution of the computer file, or some combination thereof. In some embodiments, detecting and protecting against computing breaches based on lateral movement of the computer file may further include detecting and protecting against computing malware.

In some embodiments, detecting the pattern of movement of the computer file may further include constructing a file movement graph over a predetermined period of time, where the file movement graph may include at least a first node and a second node, with the first node representative of a first time when the computer file is determined to be associated with the first device and with the second node representative of a second time when the computer file is determined to be associated with the second device, with the first node including a first identifier associated with the first device, and with the second node including a second identifier associated with the second device. In some embodiments, the predetermined period of time may be, but is not limited to, a period of a month.

In some embodiments, the second node may further include a third identifier associated with a third device. In some embodiments, the method may further include extracting at least one feature associated with the computer file from the file movement graph, and determining the likelihood score by training a machine learning model on the at least one extracted feature. In these embodiments, determining the likelihood score may be done using a binary classifier such as, but not limited to, a random forest model.

In some embodiments, extracting features from the file movement graph may further include extracting one or more features from metadata, including but not limited to, a file name, a path, a parent executable, a number of computing devices where the computer file has been located during the predetermined period of time, an average number of devices associated with the computer file in the file movement graph, a total number of devices represented in the file movement graph, a distance in time from a most recent-in-time node to a first-in-time node, a distance in time from a most recent-in-time node to a second most recent-in-time node, an average number of unique files names, whether the computer file has a digital signature, a minimum entropy time at each node, or a maximum entropy time at each node, or some combination thereof.

In some embodiments, determining the likelihood score by training the machine learning model may further include determining the likelihood score using a binary classifier. In some embodiments, determining the likelihood score using the binary classifier may further include using a Random Forest learning method.

In some embodiments, a computer device may include a processor, a memory in electronic communication with the processor, and instructions stored in the memory, with the instructions being executable by the processor to perform a method for detecting and protecting against computing breaches based on lateral movement of a computer file within an enterprise.

In some embodiments, one or more non-transitory computer-readable media may include one or more computer-readable instructions that, when executed by one or more computing devices, cause the one or more computing devices to perform a method for detecting and protecting against computing breaches based on lateral movement of a computer file within an enterprise.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Previous methods of detecting lateral movement may require constant signature updates in order to identify indicators of compromise which, in an adversarial environment where attackers are always looking for ways of evading behavioral and static signatures, may be costly and inefficient. Threat protection systems may be employed to leverage machine learning techniques which automate the discovery of security breaches.

For example, endpoint servers may gather data and telemetry about a client's network, including detecting distinctive marks and patterns left by an attacker in order to track anomalous behavior. One of the patterns that may be detected in the telemetry may include lateral movement patterns related to file operations, and in more specific cases, patterns related to the creation, update, and execution of executable files that attackers have left behind in compromised machines as the attackers traverse through the enterprise's network.

Because the lateral movement of attacks through the network occurs before a system may be compromised, early detection of lateral movement patterns provides valuable ways to identify breach attempts and creates opportunities to remediate attacks before assets may be damaged or stolen. The embodiments described herein may be capable of detecting enterprise-level lateral movement by, in some embodiments, modeling anomalous file operations within a group of computing devices operating in an enterprise network. The embodiments disclosed herein may make minimal assumptions about the techniques used by attackers to pivot from one computing device to the next, including minimal consideration of a file's contents.

Furthermore, in contrast with other solutions, the embodiments described here may not require signatures, whereas other prior approaches may require either behavioral or static signatures.

Figure 1:
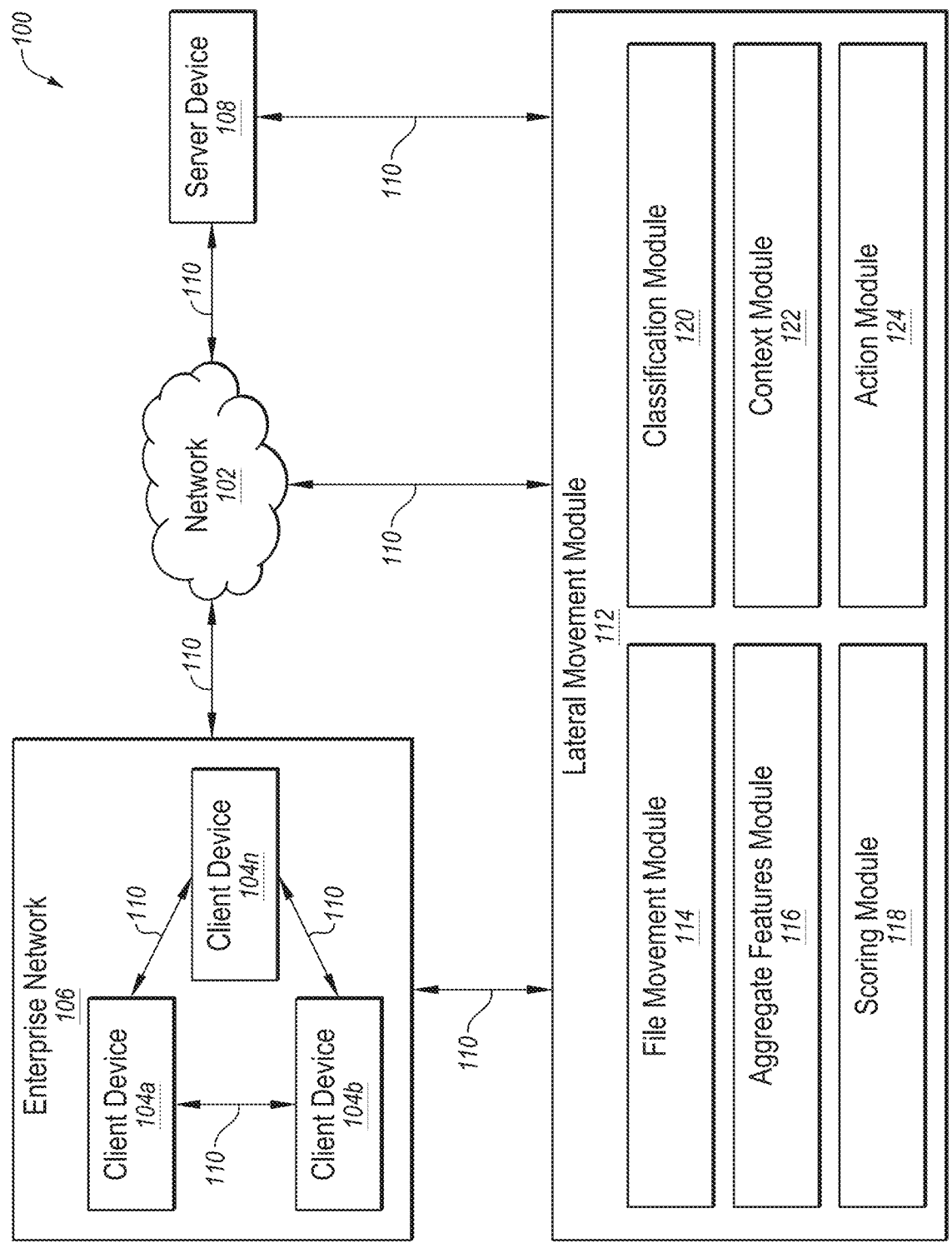
FIG. 1 illustrates an example system configured for detecting and protecting against computing breaches based on lateral movement of a computer file within an enterprise.

Turning to the figures, FIG. 1 illustrates an example system 100 configured for detecting lateral movement within an enterprise. The system 100 may include a network 102, an enterprise network 106, and a server device 108. In some embodiments, the enterprise network 106 may include a number of client devices, such as client devices 104a through 104n, where n may be any number of client devices communicating with one another within the enterprise network 106.

In some embodiments, the system may further include a lateral movement module 112. Lateral movement module 112 may be a standalone computer device, whereas in other embodiments, the server device 108 and/or any of the client devices 104a-104n may be configured to execute computer code associated with the lateral movement module 108. In some embodiments, the lateral movement module 112 may be, but is not limited to, an endpoint security application, or may be a part of a larger breach and malware detection systems, such as, but not limited to, Symantec's Targeted Attack Analytics (TAA) technology, Symantec Cynic (part of Symantec's Advanced Threat Protection), and the like. In some embodiments, a security and/or computing breach may include malware. In additional or alternative embodiments, a breach may be described as an intruder having improperly accessed a computing device within an organization, and uses the access as a foothold to access subsequent machines within the same organization. Other breaches may be contemplated.

In some embodiments, the lateral movement module 112 may further include a file movement module 114, an aggregate features module 116, a scoring module 118, a classification module 120, a context module 122, and/or an action module 124. Although modules 114-124 are shown existing within lateral movement module 112, each of the modules 114-124 may be standalone computing devices in communication with any of the components of system 100. In additional or alternative embodiments, any computer devices, such as client devices 104a-104n and/or server device 108 may execute code associated with any of the modules 114-124.

In some embodiments, the network 102 may be configured to communicatively couple the enterprise network 106 (and thus any or all of the client devices 104a-104n within the enterprise network 106), the server device 108, and/or the lateral movement module 112 via communication connections 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
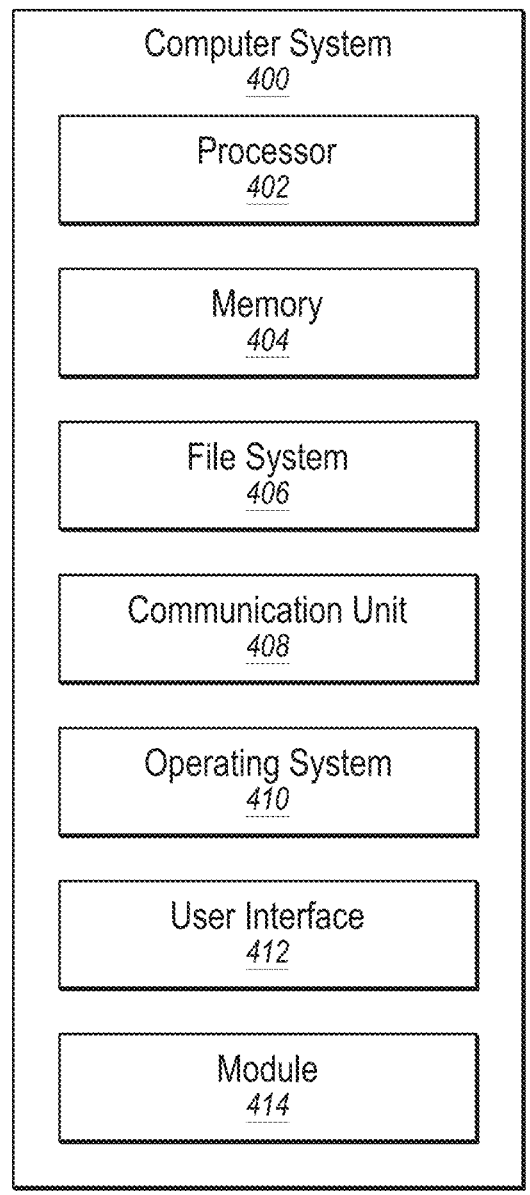
FIG. 4 illustrates an example computer system that may be employed for detecting and protecting against computing breaches based on lateral movement of a computer file within an enterprise e.

In some embodiments, the client devices 104a-104n may be any computer systems capable of communicating over the network 102 and capable of detecting lateral movement within enterprise network 106, examples of which are disclosed herein in connection with the computer system 400 of FIG. 4. Similarly, in some embodiments, the server device 108 may be any computer system capable of communicating over the network 102 and capable of detecting lateral movement within the enterprise network 106, examples of which are disclosed herein in connection with the computer system 400 of FIG. 4.

For each new file, such as an executable file, created at some point in time, the lateral movement module 112 may obtain telemetry regarding the newly created file in order to construct a graph to determine at which of the client devices 104a-104n the file has appeared over a predetermined period of time. In some embodiments, file movement module 114 may track the file over the period of a day, a week, a month, a year, or the like. In general, once file movement module 114 creates a graph for each file, the graph may be flattened in order to provide more efficient data to a machine learning model. To flatten the graph, lateral movement module 112 may extract specific data from the telemetry at the enterprise level, and various machine learning models may be trained on the data in order to determine a pseudo-prevalence of the file. With the potential addition of historical data, the file may be scored and classified to determine whether there is lateral movement or if the file is a legitimate enterprise file.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
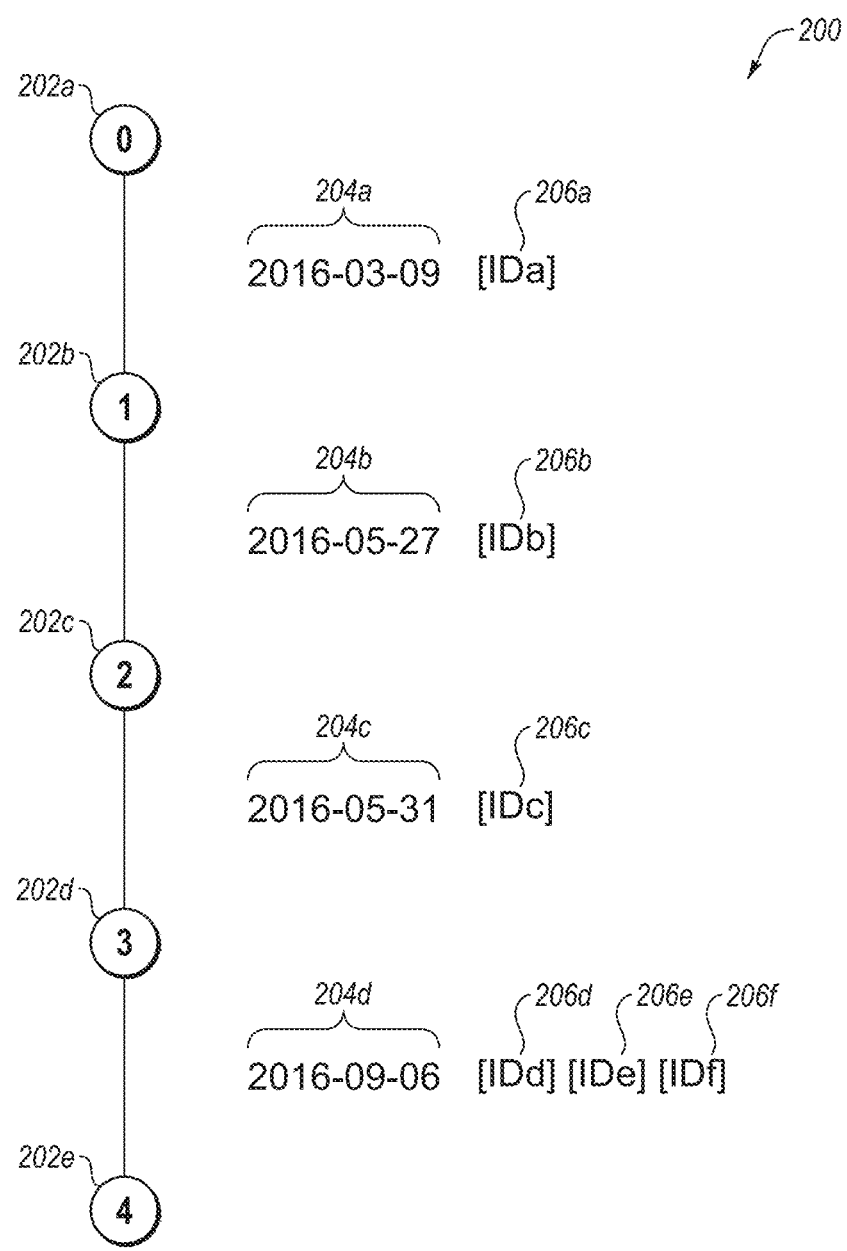
FIG. 2 illustrates an example graph related to detecting and protecting against computing breaches based on lateral movement of a computer file within an enterprise.

FIG. 2 illustrates an example graph 200 related to detecting lateral movement within an enterprise, and will be described in connection with the system 100 of FIG. 1. In particular, the file movement module 114 may create the graph 200 showing the movement of a single file throughout the enterprise network 106. Each of the nodes 202a-202e of the graph 200 indicate a specific point in time during which the file appeared on one of the client devices 104a-104n.

For example, the first time the file appeared within the enterprise network 106 may have occurred at time 0 (represented by the node 202a). The time is represented by timestamp 204a and is accompanied with a client device identification number for the client device (e.g., client device 206a) at which the file appeared at timestamp 204a (e.g., Mar. 9, 2016). Client devices 206a-206f may correspond to the client devices 104a-104n.

At time 1, (represented by node 202b), the timestamp 204b indicates that the file appeared again within the enterprise network 106 approximately eleven weeks after the first appearance, appearing on client device 206b on May 27, 2016. Graph 200 continues to show timestamped indications of when the file appears on a client device within enterprise network 106. If a file appears twice on the same client device, the graph 200 may ignore the second indication, only taking note of the first time the file appeared on a client device. In some embodiments, the file may appear on multiple client devices during a shorter period of time, such as a single day. For example, at node 202d, the file has appeared on the client devices 206d, 206e, and 206f on Sep. 6, 2016 (timestamp 204d).

Once the graph 200 is created, the lateral movement module 112 may flatten the graph 200 in order to provide a set of data on which to train at least one machine learning model to determine the patterns of the file movement and whether or not the file is likely malicious. The aggregate features module 116 may then extract features from the graph 200 on the enterprise level in order to flatten the graph.

Although the actual content of the file represented by the graph 200 may not necessarily be considered, other features associated with the file may be used to aid in creating a "likelihood" score and a classification that the file may be malicious or be associated with malicious activity. The features may include, but are not limited to, one or more of metadata, a file name, a path, a parent executable, the number of enterprises where the file has been seen in a predetermined time frame, the number of files having the same hash value during a predetermined time frame, the number of files having the same file name during a predetermined time frame, the average number of machines reached in all of the graph nodes, the number of machines in the most recent graph node, the total number of graph nodes, the distance in time (e.g., hours, days, weeks, etc.) from the last node to the first node the document was seen, the distance in time from the last node to the previous node, the average number of unique file names, the average number of unique directors, whether or not the file is signed, whether the parent file is a known remote execution tool, the minimum entropy time stamp calculated by each node, or the maximum entropy time stamp calculated by each node, or some combination thereof.

In some embodiments, the timestamps (e.g. the timestamps 204a-204d) may be converted to Unix time (i.e., using Unix Epoch) before calculating the entropy. The entropy may be used to calculate how uniform the distribution of timestamps is for each file across the enterprise network 106.

Once all of the aggregate features have been extracted and the graph 200 has been flattened, the obtained file movement data may be entered into a scoring model to determine a "likeliness" score. In some embodiments, the scoring module 118 may use the file movement data obtained from the flattened graph 200, as well as stored historical data related to previously determined lateral movement attacks.

The scoring module 118 may be trained in the form of a tree-based binary classifier such as, but not limited to, a Random Forest classifier. The scoring may also use historical features calculated from the aggregated features gathered from each graph, such as the graph 200, for each of the files used in previously known attacks, files related to non-malicious activity (e.g., clean classes, legitimate software installations, or system maintenance, or some combination thereof).

The classification module 120 may compute likelihood scores of lateral movement of a file based on the scoring determined by scoring module 118. In some embodiments, classification may be determined based on whether or not a file score satisfies a predetermined breach threshold. For example, if the likelihood that a file is part of a breach is 51% and the predetermined threshold to classify the file activity as malicious is 50%, then the breach threshold has been satisfied, and the file activity may be classified as malicious.

In some embodiments, a likelihood score of a file may satisfy a breach threshold in order to classify the file as a breach artifact, however, in an additional or alternative embodiment, there may be an additional context threshold, which may be the same or may be different than the breach threshold.

In some embodiments, the context module 122 may obtain and/or determine contextual information about the file and any associated client devices when the file satisfies the context threshold. The context information may be useful in refining detection of lateral movement and/or in determining whether there is a security threat associated with the file itself.

The context module 122 may provide the context information to an administrator of the enterprise network 106, and/or may provide the context information to one of the client devices 104a-104n. Determining and/or obtaining additional context information, as well as providing the context information to an admin, the server device 108, or one of the client devices 104a-104n may be done without human involvement; the context module 122 may make a determination to gather and send context information based on whether the likelihood score satisfies the context threshold.

The action module 124 may initiate a remedial action based on the file satisfying the breach threshold, and/or in some cases the context threshold. For example, the action module 124 may initiate a quarantine on the file, may block the file from being sent or received by computer devices, may delete the file, and the like.

Modifications, additions, or omissions may be made to the graph 200 without departing from the scope of the present disclosure. In some embodiments, the graph 200 may include additional components similar to the components illustrated in FIG. 2 that each may be configured similarly to the components illustrated in FIG. 2.

Figure 3:
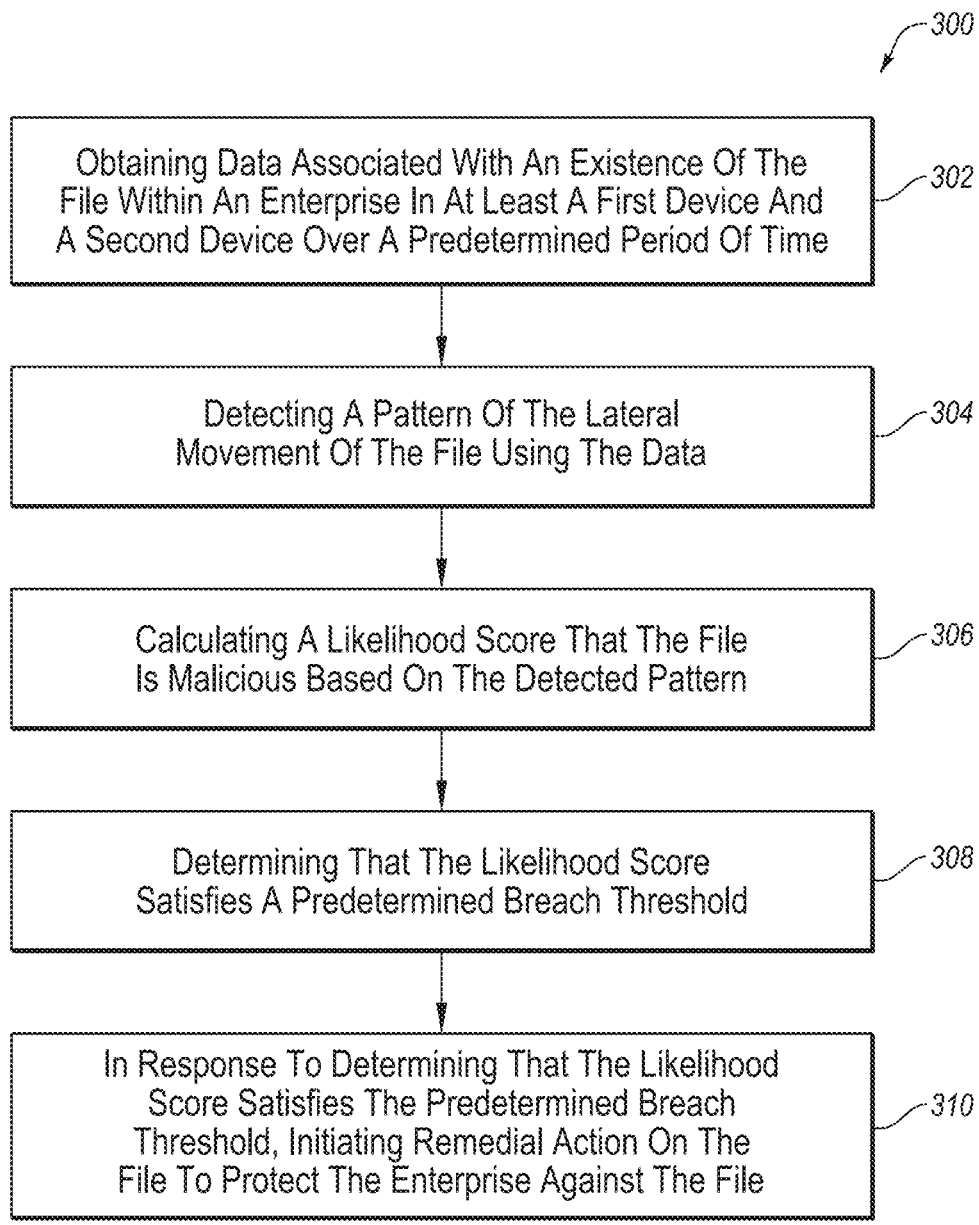
FIG. 3 illustrates a flowchart of an example method for detecting and protecting against computing breaches based on lateral movement of a computer file within an enterprise.

FIG. 3 illustrates a flowchart of an example method for detecting lateral movement within an enterprise. The method 300 may be performed, in some embodiments, by a device or system, such as by any of the client devices 104a-104n, the server device 108, and/or the lateral movement module 112 executing independently or on one of the other described devices. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, obtaining data associated with an existence a computer file in a first computing device and a second computing device of an enterprise. For example, any of the client devices 104a-104n, the server device 108, or the lateral movement module 112 may obtain the data. In some embodiments, obtaining data may include detecting the creation of the file, detecting updating of the file, or detecting execution of the file, or some combination thereof.

The method 300 may include, at action 304, detecting a pattern of lateral movement of the computer from the first computing device to the second computing device over a predetermined period of time, based on the data. For example, the lateral movement module 112 may construct a file movement graph over the predetermined period of time where the file movement graph includes at least a first node and a second node, the first node representative of a first time when the file is determined to be associated with the first device and the second node representative of a second time when the file is determined to be associated with the second device, where the first node includes a first identifier associated with the first device, and where the second node includes a second identifier associated with the second device. In some cases, one node (e.g., corresponding to one timestamp) may indicate a file has been detected on multiple devices at that time.

The method 300 may include, at action 306, calculating a likelihood score that the computer file is malicious based on the detected pattern. For example, the lateral movement module 112 may apply a machine learning binary classifier on the data extracted from the file movement graph, and associated with the file, to calculate a likelihood that the pattern of file movement indicates a potential breach. In some embodiments, the likelihood score may also be based on historical telemetry date from past breaches.

The method 300 may include, at action 308, determining that the likelihood score satisfies a predetermined breach threshold. For example, an administrator tasked with implementation of the embodiments described herein may establish a default breach threshold, which when satisfied, indicates a file is more or less likely to be considered a breach artifact. In some embodiments, the lateral movement module 112 may determine the default breach threshold automatically. As additional file activity is determined to be more or less likely to be malicious, the data related to each new file activity may be used by the machine learning models described herein to refine, update, and correct the model in order to provide a more accurate estimation of the likelihood of a breach. In addition, refining, updating, and correcting the model may operate to improve the efficiency at which the embodiments described herein operate. In some embodiments, refining the embodiments may minimize the computing power and time needed to obtain data, analyze the data, extract features from the file movement graph, calculate likelihood scores, and initiate remedial actions.

The method 300 may include, at action 310 initiating remedial action on the computer file to protect the enterprise against the computer file in response to determining that the likelihood score satisfies the predetermined breach threshold. For example, action module 124 may operate to delete the file, quarantine the file, block the file from transferring to another device, or communicate the likelihood score to a user, or some combination thereof.

Although the actions of the method 300 are illustrated in FIG. 3 as discrete actions, various actions may be divided into additional actions, combined into fewer actions, reordered, expanded, or eliminated, depending on the desired implementation.

Further, it is understood that the method 300 may improve the functioning of a computer system itself. For example, the functioning of the lateral movement module 112 on the client devices 104a-104n or on the server device 108 may itself be improved by the method 300. The embodiments described herein do not require constant engine and/or signature updates, which is both costly and inefficient, in order to identify indicators of a compromise which is one way the embodiments improve the field of breach detection. Furthermore, the embodiments described here improves the use of the way a computer system works by determining lateral movement without making assumptions about the way attacks have reached each machine in a network, the embodiments are operating system agnostic, and thus more efficient. Because the embodiments do not assume that the files have been executed, a wiping attack may be determined before the actual destruction stage is activated (e.g., before malicious attackers spread a disk formatting tool to a set of machines). In addition, the embodiments leverage background features (e.g., activity seen in other machines from different customers and/or enterprises) in order for the model to identify if a file spread pattern is unique to a restricted group of enterprises or widespread.

FIG. 4 illustrates an example computer system 400 that may be employed in detecting lateral movement within an enterprise. In some embodiments, the computer system 400 may be part of any of the systems or devices described in this disclosure. For example, the computer system 400 may be part of any of the client devices 104a-104n, the server device 108, and/or the lateral movement module 112 of FIG. 1.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more applications, such as lateral movement module 112, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as lateral movement module 112 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for detecting and protecting against a computing breach based on lateral movement of a computer file within an enterprise, at least a portion of the method being performed by a computing device comprising one or more processors, the method comprising:

obtaining data associated with an existence a computer file in a first computing device and a second computing device of an enterprise;

detecting a pattern of lateral movement of the computer file from the first computing device to the second computing device over a predetermined period of time, based on the data;

generating a file movement graph comprising a first node and a second node, wherein the first node is associated with a first device and a first timestamp representative of when the computer file was determined to be associated with the first device, and wherein the second node is associated with a second device and a second timestamp of when the computer file was determined to be associated with the second device;

calculating a likelihood score that the computer file is malicious based on the detected pattern and the file movement graph;

determining that the likelihood score satisfies a predetermined breach threshold; and in response to determining that the likelihood score satisfies the predetermined breach threshold, initiating remedial action on the computer file to protect the enterprise against the computer file.

2. The method of claim 1, further comprising:
   calculating a context score using the detected pattern;
   determining that the context score satisfies a predetermined context threshold; and
   in response to determining that the context score satisfies the predetermined context threshold, providing context information about the computer file to a user, where the context information is in addition to data associated with the movement of the computer file.

3. The method of claim 1, wherein initiating remedial action on the computer file further comprises one or more of:
   deleting the computer file, quarantining the computer file, blocking the computer file from transfer to another device, or communicating the likelihood score to a user, or some combination thereof.

4. The method of claim 1, wherein obtaining data associated with the movement of the computer file further comprises one or more of:
   detecting a creation of the computer file, detecting update of the computer file, or detecting execution of the computer file, or some combination thereof.

5. The method of claim 1, wherein detecting and protecting against the computing breach, further comprises:
   detecting and protecting against computing malware.

6. The method of claim 1, wherein
   the first node includes a first identifier associated with the first device, and the second node includes a second identifier associated with the second device.

7. The method of claim 6, wherein:
   the second node further includes a third identifier associated with a third device.

8. The method of claim 1, further comprising:
   extracting at least one feature associated with the computer file from the file movement graph; and
   determining the likelihood score by training a machine learning model on the at least one extracted feature.

9. The method of claim 8, wherein extracting the at least one feature further comprises:
   extracting one or more features from metadata, a file name, a path, a parent executable, a number of computing devices where the computer file has been located during the predetermined period of time, an average number of devices associated with the computer file in the file movement graph, a total number of devices represented in the file movement graph, a distance in time from a most recent-in-time node to a first-in-time node, a distance in time from a most recent-in-time node to a second most recent-in-time node, an average number of unique files names, whether the computer file has a digital signature, a minimum entropy time at each node, or a maximum entropy time at each node, or some combination thereof.

10. The method of claim 8, wherein determining the likelihood score by training the machine learning model further comprises:
determining the likelihood score using a binary classifier.

11. The method of claim 10, wherein determining the likelihood score using the binary classifier further comprises:
using a Random Forest learning method.

12. A computer device for detecting and protecting against detecting and protecting against a computing breach based on lateral movement of a computer file within an enterprise, comprising:
a processor;
a memory in electronic communication with the processor; and
instructions stored in the memory, the instructions being executable by the processor to:
obtaining data associated with an existence a computer file in a first computing device and a second computing device of an enterprise;
detecting a pattern of lateral movement of the computer file from the first computing device to the second computing device over a predetermined period of time, based on the data;
generating a file movement graph comprising a first node and a second node, wherein the first node is associated with a first device and a first timestamp representative of when the computer file was determined to be associated with the first device, and wherein the second node is associated with a second device and a second timestamp of when the computer file was determined to be associated with the second device;
calculating a likelihood score that the computer file is malicious based on the detected pattern and the file movement graph;
determining that the likelihood score satisfies a predetermined breach threshold; and
in response to determining that the likelihood score satisfies the predetermined breach threshold, initiating remedial action on the computer file to protect the enterprise against the computer file.

13. The computer device of claim 12, wherein the instructions are further executable by the processor to:
calculate a context score using the detected pattern;
determine that the context score satisfies a predetermined context threshold; and
in response to determining that the context score satisfies the predetermined context threshold, provide context information about the computer file to a user, where the context information is in addition to data associated with the movement of the computer file.

14. The computer device of claim 12, initiating remedial action further comprises one or more of:
deleting the computer file, quarantining the computer file, blocking the computer file from transfer to another device, or communicating the likelihood score to a user, or some combination thereof.

15. The computer device of claim 12, wherein obtaining data associated with the movement of the computer file further comprises one or more of:
detecting a creation of the computer file, detecting update of the computer file, or detecting execution of the computer file, or some combination thereof.

16. The computer device of claim 12, wherein
the first node includes a first identifier associated with the first device, and the second node includes a second identifier associated with the second device.

17. The computer device of claim 12, wherein detecting and protecting against the computing breach, further comprises:
detecting and protecting against computing malware.

18. The computer device of claim 16, wherein:
the second node further includes a third identifier associated with a third device.

19. The computer device of claim 12, wherein the instructions are further executable to:
extract at least one feature associated with the computer file from the file movement graph; and
determine the likelihood score by training a machine learning model on the at least one extracted feature.

20. One or more non-transitory computer-readable media comprising one or more computer readable instructions that, when executed by one or more processors of a computing device, cause the computing device to perform a method for detecting and protecting against a computing breach based on lateral movement of a computer file within an enterprise, the method comprising:
obtaining data associated with an existence a computer file in a first computing device and a second computing device of an enterprise;
detecting a pattern of lateral movement of the computer file from the first computing device to the second computing device over a predetermined period of time, based on the data;
generating a file movement graph comprising a first node and a second node, wherein the first node is associated with a first device and a first timestamp representative of when the computer file was determined to be associated with the first device, and wherein the second node is associated with a second device and a second timestamp of when the computer file was determined to be associated with the second device;
calculating a likelihood score that the computer file is malicious based on the detected pattern and the file movement graph;
determining that the likelihood score satisfies a predetermined breach threshold; and
in response to determining that the likelihood score satisfies the predetermined breach threshold, initiating remedial action on the computer file to protect the enterprise against the computer file.

* * * * *